United States Patent [19]
Lang et al.

[11] Patent Number: 5,521,846
[45] Date of Patent: May 28, 1996

[54] DEVICE FOR MEASURING PARAMETERS, IN PARTICULAR PARAMETERS RELATING TO AIRCRAFT OR VEHICLE WHEELS

[75] Inventors: Jean-Louis Lang, Ermont; Frédéric Piplard, Saint Cyr S/Morin; Michel Thuault, Conflans Ste Honorine, all of France

[73] Assignee: Labinal, société anonyme, Montigny-le-Bretonneux, France

[21] Appl. No.: 968,351

[22] Filed: Oct. 29, 1992

[30] Foreign Application Priority Data

Oct. 30, 1991 [FR] France .................. 91 13387

[51] Int. Cl.$^6$ .................. G01C 25/00; G01D 18/00
[52] U.S. Cl. .............. 364/558; 364/571.01; 364/571.03; 364/571.04
[58] Field of Search .......... 364/571.01–571.08, 364/558; 73/146.5, 708, 1 R, 633

[56] References Cited

U.S. PATENT DOCUMENTS

| | | |
|---|---|---|
| 4,190,804 | 2/1980 | Pyne et al. . |
| 4,192,005 | 3/1980 | Kurtz .................. 364/558 |
| 4,468,968 | 9/1984 | Kee .................. 364/571.03 |
| 4,593,370 | 6/1986 | Balkanli . |
| 4,660,854 | 4/1987 | Suzuki et al. . |
| 4,669,052 | 5/1987 | Bianco .................. 364/571.04 |
| 4,835,717 | 5/1989 | Michel et al. .................. 364/558 |
| 4,845,649 | 7/1989 | Eckhardt et al. . |
| 4,868,476 | 9/1989 | Respaut .................. 73/633 |
| 4,935,738 | 6/1990 | Pilato . |
| 5,179,981 | 1/1993 | Hicks et al. .................. 364/558 X |
| 5,218,862 | 6/1993 | Hurrell, II et al. .................. 73/146.5 |

FOREIGN PATENT DOCUMENTS

| | | |
|---|---|---|
| 0178368 | 4/1986 | European Pat. Off. . |
| 3242291 | 5/1984 | Germany . |
| 2122757 | 1/1984 | United Kingdom . |
| 2183342 | 6/1987 | United Kingdom . |
| 90/03895 | 4/1990 | WIPO . |

OTHER PUBLICATIONS

Japanese Patent Abstract, JP60–152912(A), Temperature Compensating Circuit.

Primary Examiner—Emanuel T. Voeltz
Assistant Examiner—M. Kemper
Attorney, Agent, or Firm—Larson & Taylor

[57] ABSTRACT

A device for measuring parameters such as the pressure in a tire comprises a pressure sensor subject to drift conditioned by temperature. The sensor comprises a temperature-sensitive arrangement to generate a temperature signal and transmit it with the pressure signal to a processor. The processor is adapted to deduce a correction to the value of the pressure measurement signal from the value of the signal representative of the interference.

8 Claims, 3 Drawing Sheets

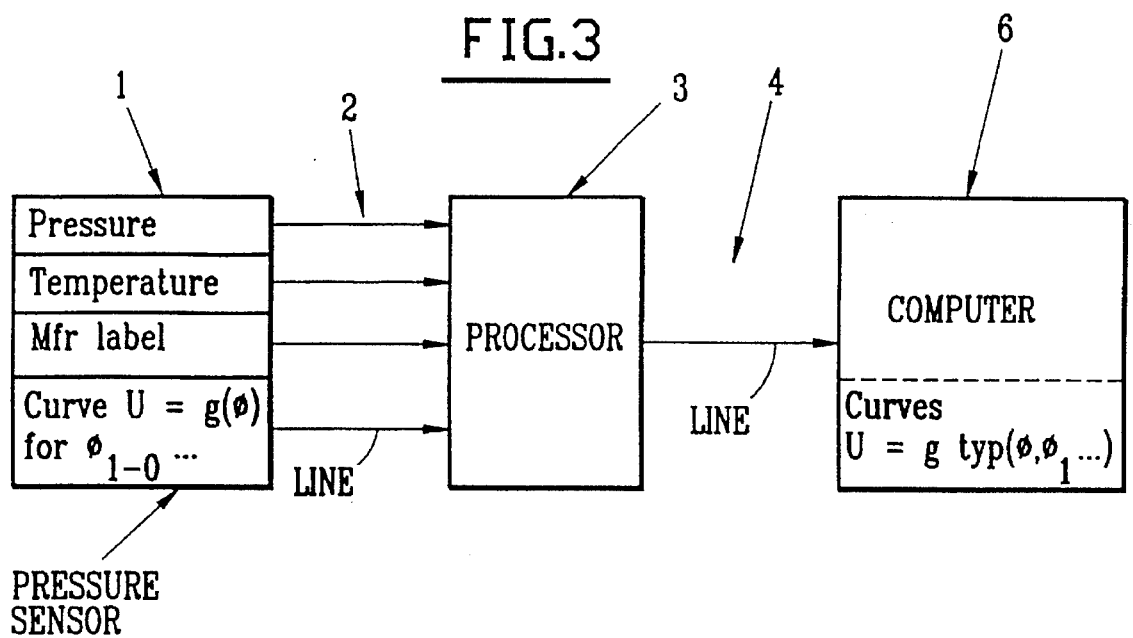
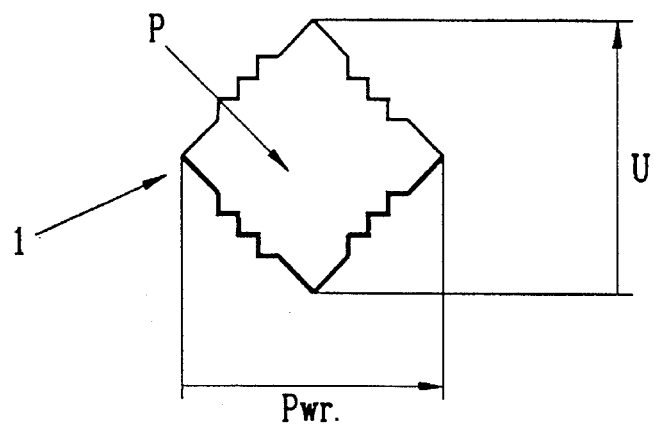
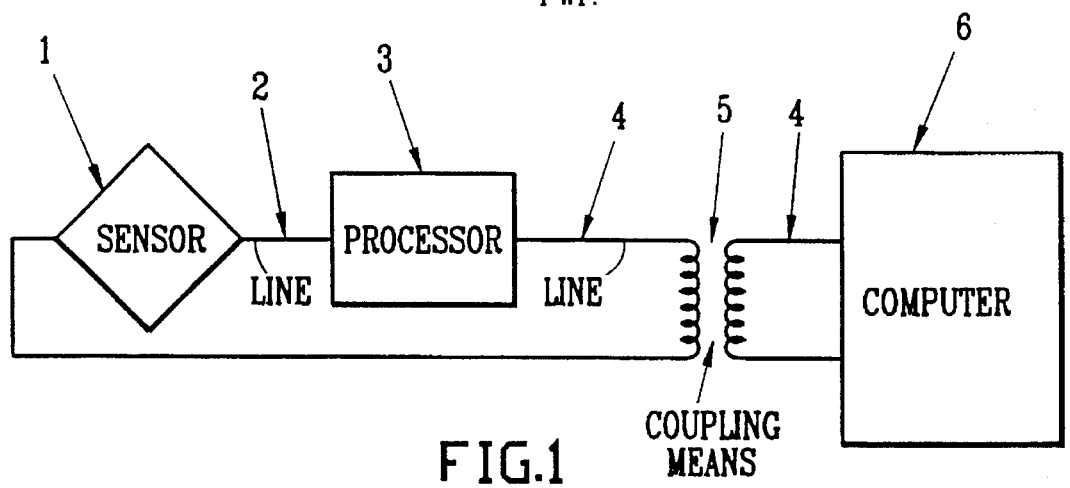

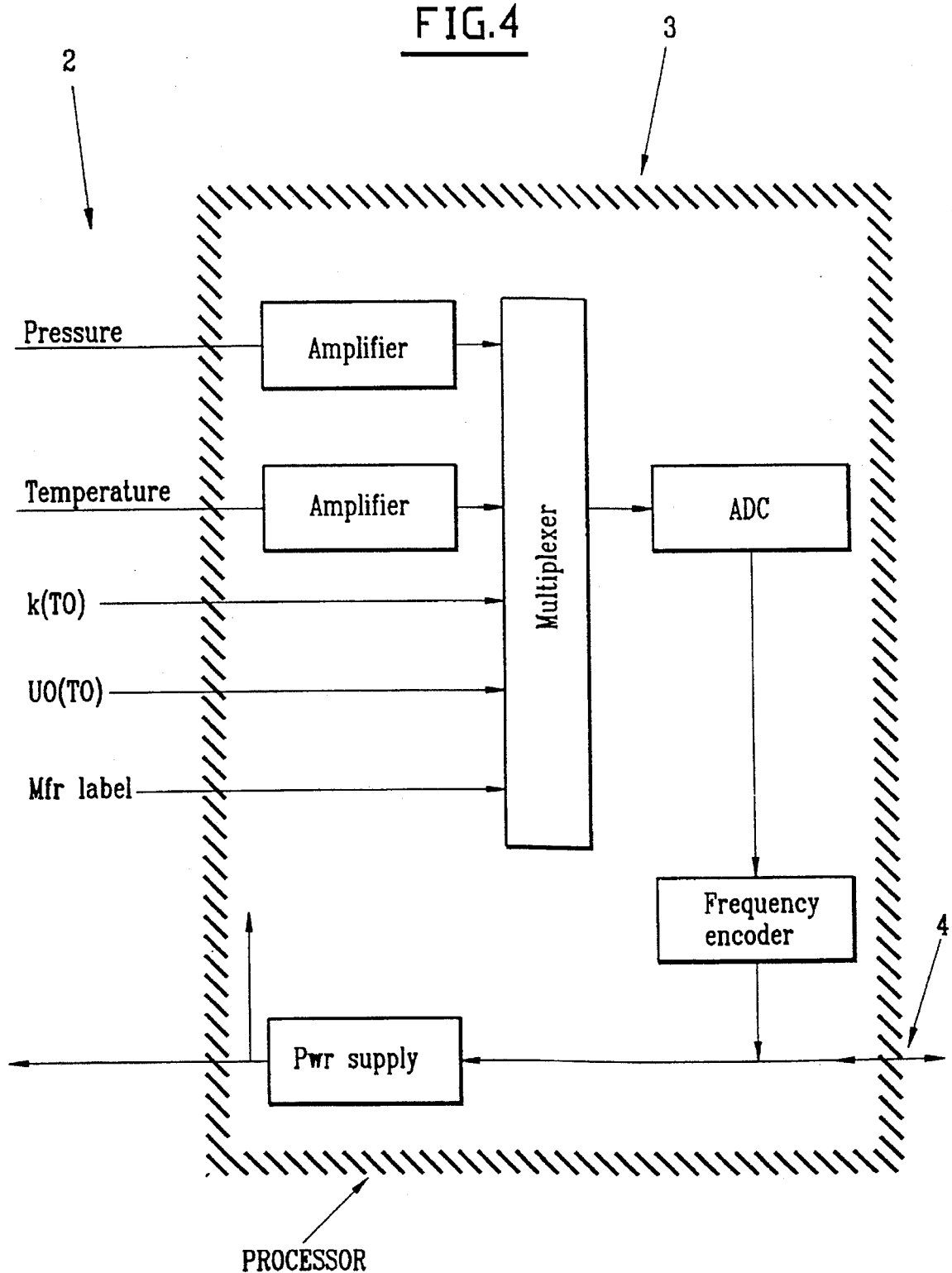

DEVICE FOR MEASURING PARAMETERS, IN PARTICULAR PARAMETERS RELATING TO AIRCRAFT OR VEHICLE WHEELS

BACKGROUND OF THE INVENTION

1. Field of the Invention

The present invention concerns a device for measuring parameters, in particular parameters relating to aircraft or vehicle wheels, such as tire pressures, for example, specifically a device of the type comprising at least one sensor, on a wheel for example, an electronic circuit associated with the sensor, means for transmitting signals conditioned by the measured parameter values and calculator means receiving and processing the measured value signals.

2. Description of the Prior Art

In devices for detecting parameters such as aircraft wheel tire pressures, for example, the measured value is converted by electronics associated with the sensor into a signal which is sent via coupling means between the rotating part and the fixed part of the wheel to means such as a computer, for example, for processing the information embodied in the signal. One of the main problems experienced with such devices arises from the effect of certain kinds of interference on the sensor whereby the measurement is subject to an offset or a drift. In the case of these pressure sensors the main interference factor is the temperature, variations in temperature causing sensor drift, although other forms of interference such as vibration or electromagnetic fields may be operative simultaneously, of course.

To compensate for temperature dependent sensor drift provision has been made to associate with the sensor on or in the wheel electronic means for compensating sensor drift caused by temperature variations so that the coupling means transmit a signal which is as close as possible to the theoretical signal representing the measurement in the absence of any interference, the signal passing through the coupling means (such as a rotary transformer, for example) and being then sent to the computer for processing.

For reasons connected with manufacture and maintenance, and in order to site the electronic means as close as possible to the physical area in which the sensor is disposed, provision has been made for integrating the sensor and its electronics into a common casing mounted in the tire, the purpose of the electronic circuit being on the one hand, to compensate for sensor drift and, on the other hand, to convert the signal into a form suitable for transmission by the coupling means.

The solutions currently used have serious drawbacks, however. Given, on the one hand, the accuracy of measurement that is now required and, on the other hand, the range of variation of the interference factors affecting the sensor, for example a very wide temperature range (from −55° C. to +180° C.), it becomes necessary to use extremely high-performance sensors whose drift is as regular as possible and in particular is proportional so that it can be accurately compensated by the electronic means over all the range of variation of the measurements and irrespective of the level of interference. Such sensors are naturally costly. Further, the associated electronic circuit which shapes and transmits measurement signals must itself be highly sensitive and of high quality, further increasing the unit cost of the system.

Of course, the difficulty increases with the performance of the installation incorporating the sensors, for example with the performance of tires which are specially designed to withstand higher temperatures, or when a second and even a third interference factor is operative.

In some cases there is provision for digital processing of pressure and temperature signals from a pressure sensor, carried out in a microprocessor, for example, using equations of the characteristic curve of the sensor obtained by calibration of the sensor over all of the range of temperature variation, these equations being stored in a memory associated with the microprocessor. This kind of implementation requires lengthy and costly calibration and uses a lot of memory capacity.

The present invention proposes to remedy these drawbacks and to provide a device for measuring parameters, in particular parameters relating to aircraft or vehicle wheels, which is of extremely reduced unit cost and simple to maintain although it is highly reliable and is able to provide measurements of sufficient accuracy over extremely wide ranges of variation in the interference factors, whilst also enabling the use of interchangeable sensors, and even replacement of sensors by sensors of a different type, all of this combined with a reduced memory capacity requirement.

SUMMARY OF THE INVENTION

The invention consists in a device for measuring parameters, in particular parameters relating to aircraft or vehicle wheels such as tire pressures, for example, in which the parameter measuring sensor is subject to drift caused by at least one interference factor such as temperature, for example, this device comprising at the same physical location as the parameter to be measured a sensor generating a parameter measurement signal, means responsive to the interference factor to generate a signal representing the magnitude of the latter, said sensor and said means being associated with an electronic means or circuit for shaping the sensor measurement signal, a signal transmission line, and processing means receiving signals transmitted through said transmission line, said processing means holding in memory data relating to sensor drift in order to deduce from the value of the signal representing the interference factor a correction to the value of the measured parameter signal that it receives, wherein said device comprises at the sensor location, means for holding in memory data relating to its response curve for a reduced number of possible values of the interference factor, wherein said electronic means or circuit is adapted to transmit to the processing means said data held at said sensor location, and wherein said processing means are adapted to hold in memory said data relating to sensor drift substantially for all of the range of the interference factor and to at least one type of sensor.

The invention is advantageously applied to measuring the pressure in aircraft or vehicle wheel tires by means of sensors subject to thermal drift, wherein the transmission of signals from and to the wheel is effected by coupling means of the electromagnetic or capacitance type, for example.

By virtue of the invention is possible to use standard sensors including sensors whose drift as a function of the interference factor is in no way linear and can be of any king.

The processing means advantageously store in memory data for calculating compensation on the basis of interference signal values and in particular the processing means may store the response curves of the sensor for different values of the interference factor. Depending on the sensor type and properties, these curves may be deduced either theoretically or by observing a sample representative of the sensor manufacture.

The curves can therefore be obtained for various values of the interference factor or factors, intermediate values being either interpolated or approximated.

The value of the interference factor for the measurement carried out at a given time by the parameter measuring sensor may be obtained by an independent sensor dedicated to the interference factor, for example a temperature sensor if temperature constitutes the interference factor.

For some types of interference, particularly for temperature, it is also possible to use some features of the parameter measuring sensor itself, which is then adapted to provide two signals, for example a pressure signal and a temperature signal.

The electronic circuit associated with the sensor preferably also shapes the data signal relating to the interference.

In a particular preferred embodiment of the invention said electronic means are adapted to provide to the transmission line comprising the coupling means between the fixed and mobile parts said two signals in the form of digital signals, preferably binary signals, their transmission via the coupling means such as a rotary transformer or capacitive coupling being effected by coding each of the two binary signals by a wave train or pulse sequence at a corresponding frequency, the two frequencies being sufficiently different to be recognizable by the processing means, even if drift affects the frequencies themselves, all of which enables use of relatively low accuracy electronic means, for example means without any temperature compensation.

Other types of frequency coding may of course be used and in some cases it may be feasible to use analog signals rather than digital signals.

Other advantages and features of the invention will emerge from the following description given by way of non-limiting example with reference to the appended drawings.

BRIEF DESCRIPTION OF THE DRAWINGS

FIG. 1 is a general block diagram of an installation in accordance with the invention.

FIG. 2 is a diagrammatic representation of a sensor.

FIG. 3 is a block diagram of the logic of an installation in accordance with the invention.

FIG. 4 is a block diagram of the electronics associated with the sensor.

DETAILED DESCRIPTION OF THE INVENTION

Figure 5A:
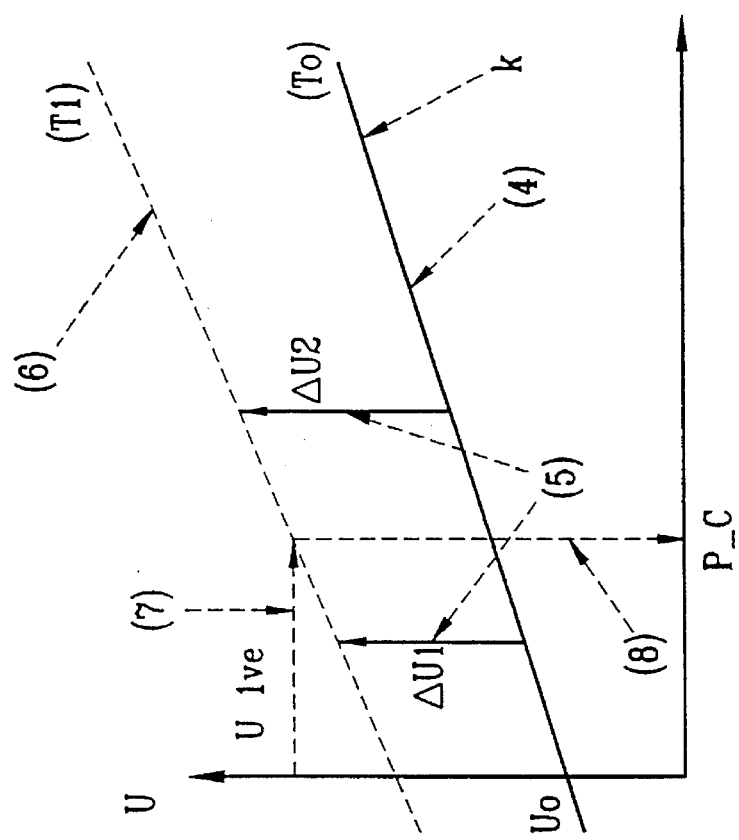
FIG. 5 is a diagram showing the curves stored in the computer.

FIG. 1 is a highly diagrammatic representation of an aircraft undercarriage wheel pressure measuring installation. A pressure sensor 1 mounted on the wheel rim sends data over a line 2 which may comprise multiple conductors to a processing electronic circuit or processor 3 which converts the data from the sensor into binary signals at respective frequencies of 50 kHz and 80 kHz which are sent over the line 4 and via coupling means 5 comprising a rotary transformer with one winding fastened to the fixed part of the undercarriage and the other winding fixed to the wheel, the output of the first winding being connected to a computer 6 through an appropriate interface (not shown) converting signals from the line 4 into pulses directly usable by the computer.

The sensor may be a resistive Wheatstone bridge type sensor the pressure-sensitive part of which is as diagrammatically represented in FIG. 2, for example. As shown in FIG. 3, the stimuli from the electronics 3 provide measurement of: the pressure as measured by the sensor, and the temperature as measured by the sensor, the (fixed) identifying label of the sensor manufacturer and the factors for characterizing the curve $U=g(\phi)$ for known interference factors values (a temperature value, for example), U being the voltage generated by the sensor for a pressure $\phi$. This data, conditioned by the processor electronics, is then sent via the line 4 and the coupling means 5 to the computer 6. The computer 6 holds in memory the curves $U=g_{typ}(\phi, \phi_1, \phi_2, \text{etc})$, where $\phi_1$, $\phi_2$, etc are the interference factors, for example the temperature T, said curves corresponding to the manufacturer label. Computer 6 corrects the signal according to the received temperature value. The measured pressure parameter, $\phi$ is thus compensated and is then used by the processing means.

The data to be stored in a device in accordance with the invention may be calculated as follows:

The characteristic curve of the sensor used is $U=f(\phi)$ where $\phi$ is the physical value measured by the sensor, for example the pressure P, and U is the electrical or other value obtained. For the pressure P, for example, the curve $U=f(P)$ would be $U=\underline{k} * P + Uo$ where $\underline{k}$ is the slope of the straight line segment and Uo is the fixed offset. Because the sensor is subject to drift dependent on the interference factors $\phi_1, \phi_2, \phi_3$, etc it is characterized by the curve $U=g(\phi, \phi_1, \phi_2, \phi_3, \text{etc})$. In the case of a pressure sensor, $U=k(T) * P+Uo(T)$ where T is the temperature and $\underline{k}$ and Uo vary with temperature.

The curve $U=g(\phi, \phi_1, \phi_2, \phi_3, \text{etc})$ is then determined for given interference factor values, $\phi_1-0, \phi_2-0, \phi_3-0$, for each sensor and, for a given type of sensor, the typical value of U is determined either from the theoretical operating prediction of the sensor used or from the observation of a sample representative of the sensor manufacture, which yields a set of curves $U_{typ}=h(\phi, \phi_1, \phi_2, \phi_3, \text{etc})$ dependent on the various interference factors. Assuming that the offset between the value of U of a given sensor and $U_{typ}$ for given interference factor values $\phi_1-0, \phi_2-0, \phi_3-0$ is the same as that of the function U of the same sensor and of $U_{typ}$ for any interference factor values $\phi_1, \phi_2, \phi_3$ (which is the case for consistent manufacture) it is then sufficient to deduce $U(\phi, \phi_1, \phi_2, \phi_3, \text{etc})= U_{typ}(\phi, \phi_1, \phi_2, \phi_3, \text{etc})+U(\phi, \phi_1-0, \phi_2-0, \phi_3-0, \text{etc})-U_{typ}(\phi, \phi_1-0, \phi_2-0, \phi_3-0, \text{etc})$.

In the case of tire pressure sensors, for example, the curve $U=k(To) * P +Uo(To)$ is thus determined for each sensor of a given type and the same particular temperature To. Further, for this type of sensor the curve of variation in the coefficients $\underline{k}$ and Uo as a function of temperature is established either theoretically or by calculating the average from a representative manufacturing batch of this type of sensor. The voltage output by the sensor at a given temperature value T will then be $U=(k_{avg}(T)+k(To)-k_{avg}(To)) * P+Uo_{avg}(T)+Uo(To)-Uo_{avg}(To)$.

It is then advantageous to store in the sensor itself the fixed data determined by the curve $U=k(To) * P+Uo(To)$ which in a practical case amounts to storing two items of data k (To) and Uo (To), for example. This data, which defines the curve $U=g(\phi)$ for a given interference factor value, in this instance: To, will therefore be available for reading by the processing electronic circuit 3.

As a general rule, if the curve $U=g(\phi, \phi_1-0, \phi_2-0, \phi_3-0,$ etc) can be described by $U=h_1(\phi) * g_1(\phi_1-0, \phi_2-0, \phi_3-0,$ etc)+h2 (φ) * g2 (φ1–0, φ2–0, φ3–0, etc)+etc, the data stored in the sensor is then g1 (φ1–0, φ2–0, φ3–0, etc), g2 (φ1–0, φ2–0, φ3–0, etc), etc, this data being fixed values.

The curves U=gtyp (φ, φ1, φ2, φ3, etc) are stored in the computer for different values of the interference factors. The values of U for intermediate interference factor values are then computed by interpolation or approximation as usual.

As an alternative to this, to reduce the volume of data to be stored the sensor could store not the values g1, g2, etc but their differences from typical values.

The fixed data stored in the sensor may be embodied in the form of resistors proportional to the values to be transmitted.

In the same way as the sensor parameter values are compensated in function of the interference factors it is possible to compensate for errors in the processing electronics due to these interference factors. The compensation is effected by the computer, as with the sensor.

Application Example

Each sensor is characterized by the curve $u_i = k_i(T) * U(T)$

The sensors of a manufacturing batch are represented by the average curve $u\ typ = k\ typ(T) * P + U0\ typ(T)$ With a sensor "i" the manufacturer adds a resistor proportional to $k_i(T0)$ and another proportional to $U0(T0)$ In the computer the parameters of the average curve as a function of temperature are stored in memory:

at T0: k typ(T0) and U0 typ(T0)

at T1: k typ(T1) and U1 typ(T1)

at T2: k typ(T2) and U2 typ(T2) etc.

The temperature sensor incorporated into the pressure sensor indicates the value T1

The pressure sensor gives a voltage of value U read1

The sensor module 1 therefore supplies the following analog data to the processing electronics:

T1

U read1 k i(T0)

U0(T0)

manufacturer label.

The processing electronics or processor 3 shapes these signals, multiplexes them, converts them into digital form and then frequency modulates them for transmission via the coupling means 5 to the computer 6.

The computer looks up in the memory assigned to the specific manufacturer's data (this area is assigned to the manufacturer label) the coefficients k typ(T1) and U1 typ(T1) for the temperature T1 and k typ(T0) and U0 typ(T0) for the temperature T0.

Figure 5B:
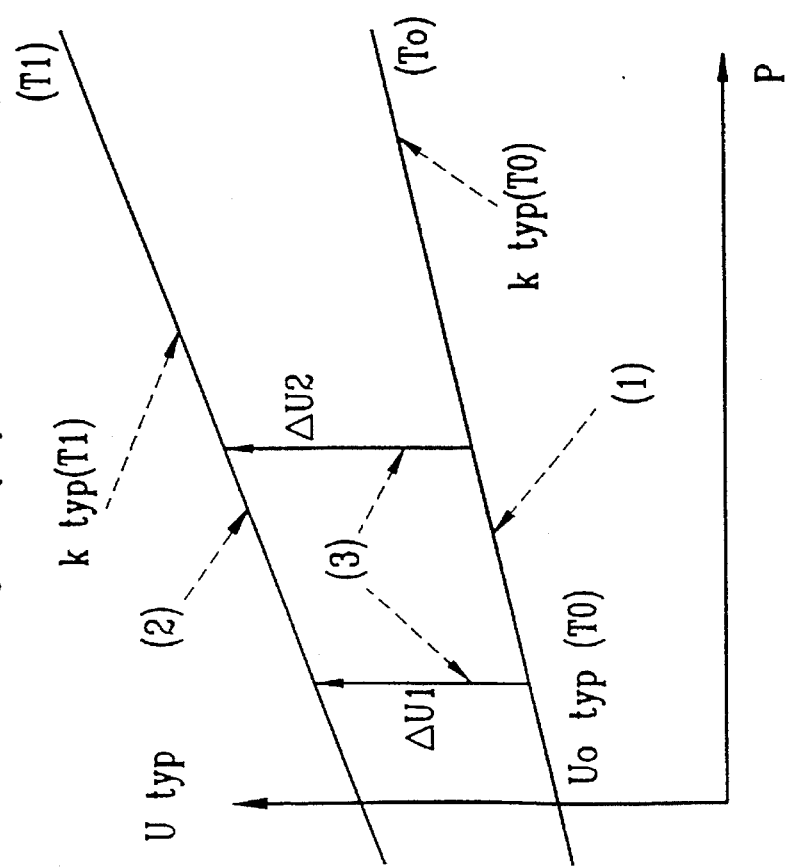

The computer therefore gives the computed value P c such that $k\ typ(T1) * P\ c + U0\ typ(T1) - k\ typ(T0) *$ $P\ c - U0\ typ(T0) + U\ read1 - k\ i(T0) * P\ c - U0(T0)$ that is $P\ c = [U0\ typ(T0) - U0\ typ(T1) + U\ read1 -$ $U0(T0) + U0\ typ(T0) - U0\ typ(T1)]/[k\ typ(T1) -$ $k\ typ(T0) + k\ i(T0)]$ The FIG. 5 diagram shows the calculations carried out in the computer to determine this pressure P c.

There is claimed:

1. A device for measuring parameters, said device comprising:

a sensor for generating a parameter measuring signal, said sensor being subject to drift caused by at least one interference factor;

means responsive to said interference factor for generating an interference measuring signal related to the magnitude of said interference factor;

a first memory means connected to said sensor for storing particular sensor data comprising response data relating to the response curve of said sensor for a reduced number of possible values of the interference factor;

a second memory means independent of said sensor for storing typical sensor data comprising typical drift data relating to typical sensor drift for at least one type of sensor over substantially the entire range of interference;

transmitting means for conditioning and transmitting said parameter measuring signal and said interference measuring signal together with said particular sensor data; and processing means for receiving said typical sensor data from said second memory means, for receiving from said transmitting means said interference measuring signal and said parameter measuring signal together with said particular sensor data, and for determining from said particular sensor data and said typical sensor data, and from the values of said interference measuring signal and said parameter measuring signal, the correction to be applied to the value of said parameter measuring signal to compensate for drift.

2. A device according to claim 1, wherein said response data stored in said first memory means is data relating to said response curve for only one given value of said interference factor.

3. A device according to claim 1, wherein said transmitting means includes coupling means.

4. A device according to claim 1, wherein said sensor comprises a pressure sensor and said responsive means is means responsive to the temperature of said sensor.

5. A device according to claim 4, wherein said pressure sensor incorporates said temperature responsive means.

6. A device according to claim 1, wherein said response data relating to said response curve of said sensor is offset data relative to a typical function representative of the type of sensor for the applicable level of interference.

7. A device according to claim 1, wherein said particular sensor data further comprises sensor identifying label data.

8. A device according to claim 1, for measuring the pressure in an aircraft undercarriage wheel, wherein said transmitting means comprises rotary electromagnetic transformer coupling means.

* * * * *